United States Patent
Drucker

(10) Patent No.: US 6,883,602 B2
(45) Date of Patent: Apr. 26, 2005

(54) DEHUMIDIFIER FOR USE IN MASS TRANSIT VEHICLE

(75) Inventor: Alan S. Drucker, Dewitt, NY (US)

(73) Assignee: Carrier Corporation, Farmington, CT (US)

( * ) Notice: Subject to any disclaimer, the term of this patent is extended or adjusted under 35 U.S.C. 154(b) by 50 days.

(21) Appl. No.: 10/160,327

(22) Filed: May 31, 2002

(65) Prior Publication Data

US 2003/0221820 A1 Dec. 4, 2003

(51) Int. Cl.[7] .............................. B60H 1/00; B60H 3/00; F25B 29/00
(52) U.S. Cl. ..................... 165/202; 165/266; 165/42; 165/43; 62/90; 62/93; 62/95; 62/96; 62/244; 62/DIG. 22
(58) Field of Search .............................. 165/202, 266, 165/42, 43; 62/90, 93, 95, 96, 244, DIG. 22

(56) References Cited

U.S. PATENT DOCUMENTS

| | | | | |
|---|---|---|---|---|
| 2,774,227 A | * | 12/1956 | Schinlin et al. | 62/90 |
| 3,141,762 A | * | 7/1964 | Klaus | 165/909 |
| 3,561,525 A | * | 2/1971 | Baer | 165/104.26 |
| 4,448,035 A | * | 5/1984 | Moriyama et al. | 165/43 |
| 4,848,444 A | * | 7/1989 | Heinle et al. | 165/202 |
| 4,934,451 A | * | 6/1990 | Colvin | 62/95 |
| 6,170,271 B1 | * | 1/2001 | Sullivan | 62/93 |
| 2001/0037873 A1 | * | 11/2001 | Fredj et al. | 165/43 |

FOREIGN PATENT DOCUMENTS

| | | | | |
|---|---|---|---|---|
| JP | 0008418 | * | 1/1983 | 62/90 |
| JP | 58190641 A | * | 11/1983 | F24F/11/02 |
| JP | 04159125 A | * | 6/1992 | B60H/01/32 |
| JP | 07233968 A | * | 9/1995 | F24F/03/00 |

* cited by examiner

Primary Examiner—John K. Ford
(74) Attorney, Agent, or Firm—Wall Marjama & Bilinski LLP

(57) ABSTRACT

An evaporator unit for use in the air conditioning system of a mass transit vehicle that includes a housing mounted inside the air conditioned section of the vehicle having a return air inlet connected to a supply air outlet by a flow passage. The evaporator coil of the air conditioner is mounted in the flow passage to cool the air moving through the passage. A heater coil is mounted behind the evaporator coil to selectively heat the air moving through the passage. A dehumidifying coil is mounted in front of the evaporator coil that utilizes ambient air to dehumidify the indoor air when the ambient air temperature is at a temperature below that at which the air conditioner cannot reliably operate.

6 Claims, 2 Drawing Sheets

DEHUMIDIFIER FOR USE IN MASS TRANSIT VEHICLE

FIELD OF THE INVENTION

This invention relates to a motorized mass transit vehicle such as a bus and, in particular, to a system for dehumidifying the air within an air conditioned section of the vehicle.

BACKGROUND OF THE INVENTION

Buses and other similar vehicles for transporting a number of people are generally air conditioned to provide cooling on warm days. In addition, heating is provided to warm the interior of the vehicle when the days become cooler. With the advent of colder days, the relative humidity of the heated air inside the vehicle increases and the moisture in the air condenses upon the cooler surfaces of the vehicles, particularly the windows. This, in turn, makes it difficult for the driver to safely see out of the vehicle thereby producing a driving hazard. In addition, the atmosphere in the vehicle becomes ladened with moisture making the occupants uncomfortable.

Heretofore it has been the common practice on the part of the vehicle operator to turn on the air conditioning system when moisture builds up upon the windows in an effort to reduce the humidity in the air by cooling the air. However, running the air conditioning system when the ambient air temperature is relatively low places an unwanted load on the systems compressor which can lead to an early system failure. Additionally, the air conditioning cooling system is forced to work against the heating system as the air is being dehumidified thus resulting in a considerable waste of energy.

SUMMARY OF THE INVENTION

It is therefore a primary object of the present invention to improve the interior atmosphere within a passenger vehicle.

It is a further object of the present invention to improve the safety of a mass transit vehicle such as a bus.

It is a still further object of the present invention to provide greater comfort to the passengers of a mass transit vehicle.

Another object of the present invention is to conserve energy when removing moisture from the indoor air of a mass transit vehicle.

Still another object of the present invention is to protect the air conditioning system of a mass transit vehicle from premature failure.

These and other objects of the present invention are attained by an evaporator unit for use in the air conditioning system of a mass transit vehicle. The unit includes a housing mounted inside the air conditioned section of the vehicle having a return air inlet and a supply air outlet that are connected by a flow passage. The evaporator coil of the air conditioner is mounted in the housing to cool air moving between the air inlet and the air outlet. A heating coil is placed behind the evaporator coil that draws motor coolant from the engine of the vehicle to heat the air being conducted through the housing. A dehumidifying heat exchanger is placed in front of the evaporator coil for cooling the air moving through the housing during periods when the ambient air temperature is relatively low and the air conditioner is not operating. The low temperature ambient air is utilized to cool the indoor air of the vehicle as it moves through the evaporator housing either directly or through a closed loop cooling circuit employing a suitable coolant or refrigerant.

BRIEF DESCRIPTION OF THE DRAWING

For a better understanding of these and other objects of the invention, reference will be made to the following detailed description of the invention which is to be read in association with the accompanying drawing, wherein:

FIG. 1 is a perspective view of a mass transit vehicle employing the teachings of the present invention; and.

DETAILED DESCRIPTION OF THE INVENTION

Figure 1:
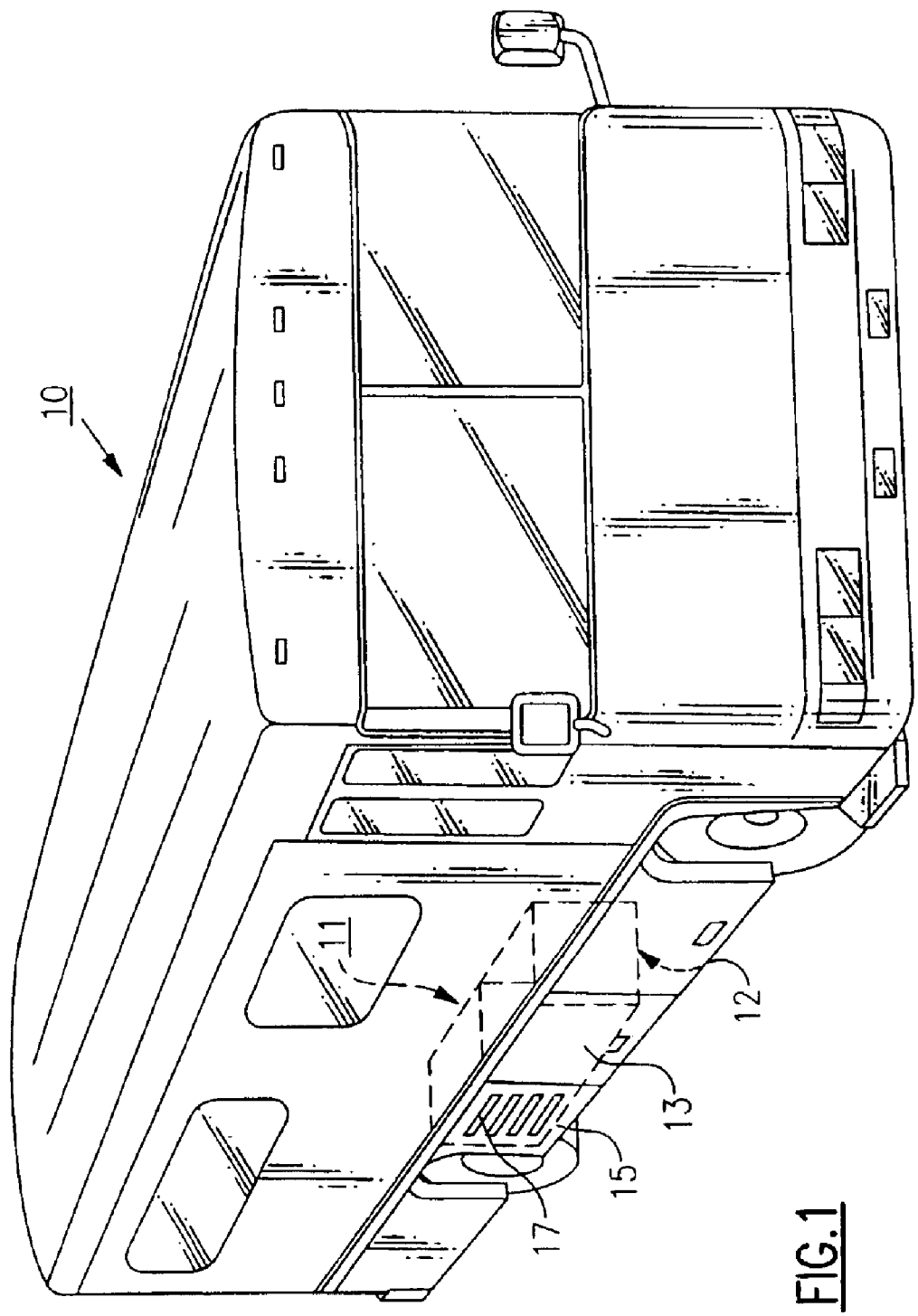

Turning now to the drawings there is shown in FIG. 1 a small bus generally referenced 10, of the type typically used to shuttle passengers about airports or the like. Although the invention is ideally suited for this type of conveyance, it should be clear to one skilled in the art that the invention can be utilized in association with many types of mass transit vehicles. As is well known the air inside buses that are crowded with passengers on cold days becomes ladened with moisture. Under these conditions, the relative humidity of the air soon reaches a point where the moisture in the air rapidly condenses on the vehicle windows making driving hazardous and the conditions inside the vehicle uncomfortable for the occupants.

The air conditioning system 11 servicing the bus is located in the access bays of the vehicle that open to the curb side of the bus. As illustrated in FIG. 1, the evaporator section 12 of the air conditioning system is located in a bay 13 separate from an adjacent bay 15 containing the remaining parts of the system. The condenser of the air conditioning system is located in bay 15 and is arranged to reject heat from the bay through elongated cutouts 17 provided in the bay door.

Here again, although the evaporator section of the air conditioning system is shown mounted as a unit within an access bay, it should be clear that the unit can be mounted in any convenient location within the air conditioned interior of the bus.

Figure 2:
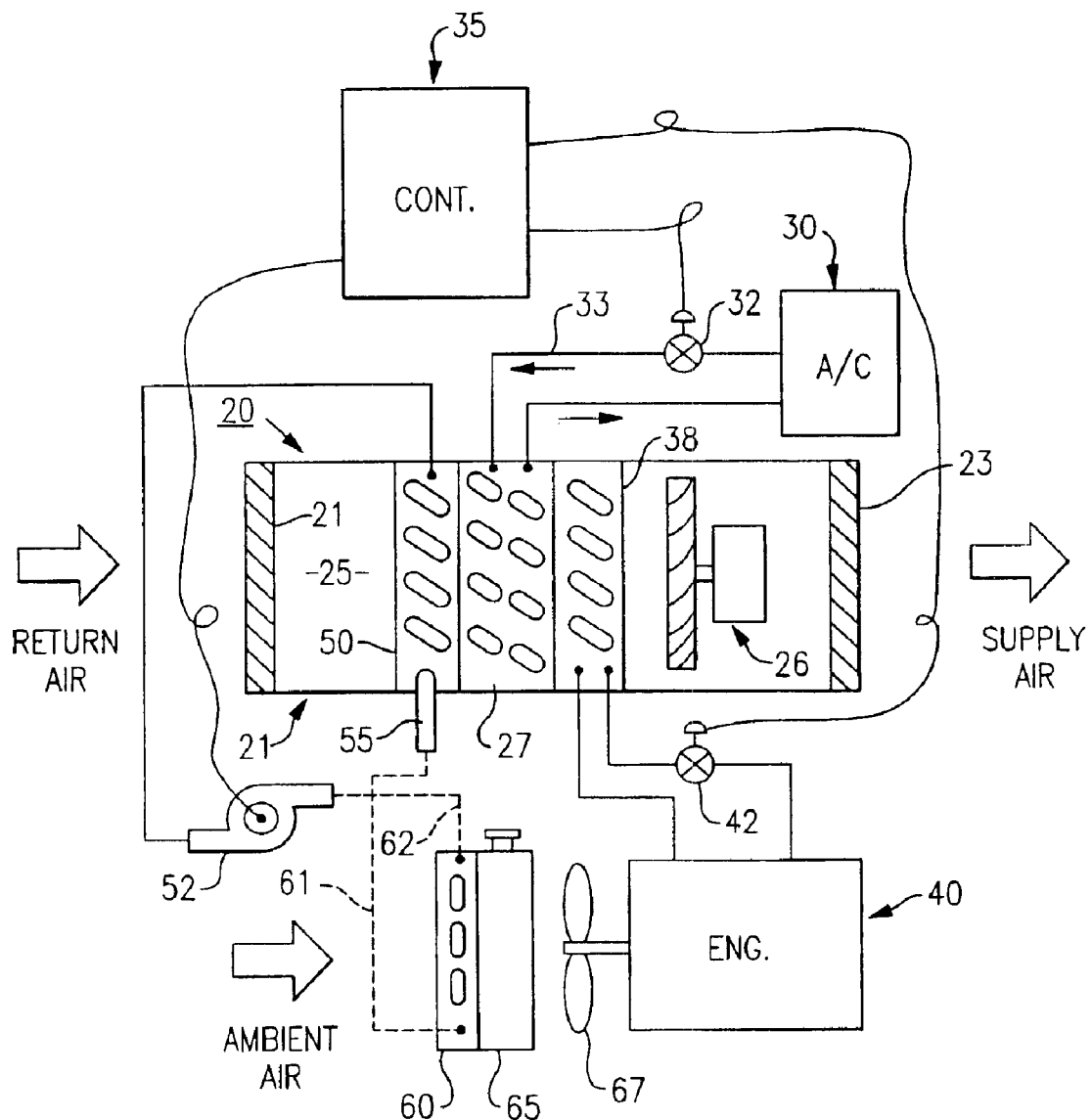
FIG. 2 is a schematic representation of the evaporator section of the vehicles air conditioning system.

Turning now to FIG. 2, there is shown a schematic view of an evaporator unit 20 embodying the present invention. The main components of the unit are contained in a rectangular housing 21 fabricated of sheet metal or any other suitable material such as plastic or the like. The housing contains a return air inlet 21 through which air from the passengers compartment enters the housing. A supply air outlet 23 is located at the opposite end of the housing through which conditioned air is discharged back into the passengers compartments. Adjustable louvers 24 for directing the air flow are shown mounted in both openings. The main body of the housing provides a linear flow passage 25 that extends between the inlet opening and the outlet opening of the housing. A fan unit 26 is mounted within the housing for moving air through the housing between the inlet and outlet openings.

An evaporator coil 27 is mounted in the center section of the housing which completely fills the flow passage. The evaporator coil is connected to an air conditioning system 30 by means of refrigeration lines and is adapted to cool the air moving through the housing. A throttling valve 32 is mounted in the refrigerant supply line 33 that provides liquid refrigerant to the coil. The throttling valve is remotely controlled by a controller 35 to regulate the cooling of the air passing through the housing.

A heating coil 38 is mounted in the housing behind the evaporator coil and is supplied with engine coolant from the vehicle motor 40. The coolant is circulated through the heating coil via an engine mounted pump (not shown) to selectively heat the air moving through the housing. The flow of engine coolant is controlled remotely from the controller via valve 42 that is mounted in one of the lines servicing the heater coil. Typically, the evaporator coil will be shut down when the heater coil is operating. Conversely, the heater coil will be shut down when the evaporator is operating. However, as noted above, there are times when the moisture content in the air conditioned section of the bus becomes so high when the heating coil is operating that the moisture in the air condenses on the cool surfaces of the vehicle and, in particular, the vehicle windows. When this occurs, it has been common practice for the operator to turn on the air conditioning system in an effort to dehumidify the indoor air. This generally occurs when the ambient air temperature is relatively cool. Operating the air conditioning system under these conditions places an undue load on the systems compressor which in turn, can lead to an early failure of the system.

A dehumidifying coil 50 is mounted in the housing in front of the evaporator coil. In one form of the invention cold ambient air is simply drawn into the dehumidifying coil by a pump 52 which drives the air through the coil and thus cools the return air passing through the housing to reduce the moisture content of the air. The outside air that passes through the coil is simply passed back to the surrounding ambient through a discharge tube 55. Here the operation of the pump 52 is regulated by the controller 35 so that the dehumidifying coil will take over the air cooling function any time the outdoor air temperature drops below a level at which the air conditioning system cannot efficiently operate. It has been found that the dehumidifying coil can effectively remove moisture from the indoor air at temperatures at or below 45° F.

In a second embodiment of the invention, an outside heat exchanger 60 is mounted outside the air conditioned section of the vehicle where it is exposed to ambient air. As depicted by the dotted lines 61 and 62, a closed circuit is provided between the outdoor coil 60 and the indoor dehumidifying coil 50. A suitable cooling fluid or refrigerant is circulated through the circuit via pump 52. Although the outdoor coil can be mounted in any suitable location, preferably it is mounted in front of the engine radiator 65. In this location, the outdoor coil comes under the influence of the engine fan 67 as well as being fully exposed to the outside air stream created as the vehicle moves through the outside air thus providing for enhanced cooling of the return air.

While the present invention has been particularly shown and described with reference to the preferred mode as illustrated in the drawing, it will be understood by one skilled in the art that various changes in detail may be effected therein without departing from the spirit and scope of the invention as defined by the claims.

I claim:

1. An evaporator unit in combination with the air conditioning system of a motorized passenger vehicle, said unit including a housing enclosed inside an air conditioned section of the vehicle, said housing having a return air inlet and a supply air outlet and a flow passage that connects the air inlet to the air outlet, fan means for moving air through said passage between the air inlet and the air outlet, an evaporator heat exchanger mounted in the flow passage for cooling air moving through said passage, a heating coil mounted in said flow passage, a first circulating means for passing engine coolant from the motorized vehicle engine through said heating coil to heat the air moving through said flow passage, a dehumidifying heat exchanger mounted in said flow passage for removing moisture from the air moving through the flow passage, and a second circulating means for passing a cooling fluid through a closed dehumidifying circuit separate from said air conditioning system and including an outdoor heat exchanger exposed to the outside air stream created by movement of the vehicle and not including a compressor, and through said dehumidifying heat exchanger for cooling air moving through said flow passage.

2. The unit of claim 1 wherein said second circulating means includes a pump for circulating said cooling fluid through said dehumidifying heat exchanger.

3. The unit of claim 1 wherein said outdoor heat exchanger is mounted in front of an engine driven fan of said motorized vehicle engine.

4. The unit of claim 1 that further includes control means for selectively controlling the operating of said evaporator heat exchanger, said heating coil and said dehumidifying heat exchanger.

5. The unit of claim 2 wherein said control means is arranged to render the evaporator heat exchanger inoperative when the ambient air temperature falls below a predetermined level.

6. The unit of claim 5 wherein said predetermined level is about 45° F.

* * * * *